United States Patent
Harris, Sr.

(10) Patent No.: US 10,820,578 B2
(45) Date of Patent: Nov. 3, 2020

(54) GARDEN POND WITH BOTTOMLESS GARDEN PLANT WATERING-WELL

(71) Applicant: Donald Eugene Harris, Sr., Cedar Park, TX (US)

(72) Inventor: Donald Eugene Harris, Sr., Cedar Park, TX (US)

( * ) Notice: Subject to any disclaimer, the term of this patent is extended or adjusted under 35 U.S.C. 154(b) by 72 days.

(21) Appl. No.: 16/269,737

(22) Filed: Feb. 7, 2019

(65) Prior Publication Data
US 2020/0253169 A1 Aug. 13, 2020

(51) Int. Cl.
*A01K 63/00* (2017.01)
*A01G 31/02* (2006.01)

(52) U.S. Cl.
CPC ............ *A01K 63/006* (2013.01); *A01G 31/02* (2013.01)

(58) Field of Classification Search
CPC .............................. A01K 63/00; A01K 63/006
See application file for complete search history.

(56) References Cited

U.S. PATENT DOCUMENTS

| 3,819,080 | A  | * | 6/1974  | Bird ................... | B65D 81/3216 |
|-----------|----|---|---------|------------------------|--------------|
|           |    |   |         |                        | 229/120      |
| 7,575,181 | B2 | * | 8/2009  | Weemhoff ............  | B05B 17/085  |
|           |    |   |         |                        | 239/17       |
| 7,731,841 | B1 | * | 6/2010  | Tennyson, Jr. ........ | B01F 3/0473  |
|           |    |   |         |                        | 210/151      |
| D850,020  | S  | * | 5/2019  | Paxson .................| D30/132      |
| 2005/0167347 | A1 | * | 8/2005 | Thomas .............. | A01K 63/006  |
|           |    |   |         |                        | 210/170.06   |
| 2018/0313049 | A1 | * | 11/2018| Morelli .................. | B01D 35/26 |

* cited by examiner

*Primary Examiner* — Sarah B McPartlin (57) ABSTRACT

In accordance with the present embodiment of the Garden Pond with Bottomless In-Ground Garden-Plant Watering-Well, there is provided a garden-pond with a reinforced socketed base for inserting supporting twist-lock stems for aquatic plant-baskets and assorted aquatic fixtures such as fountains. The in-ground garden-plant watering-well is part of the garden pond's outer wall and is open at both ends and is both functional and decorative. This embodiment also consists of a plant-container that has an above ground-level portion and a below-ground-level portion. The above ground-level portion is the watering-well, and the below-ground-level portion is the well-barrel. The aquatic garden pond feature can be set into the ground, and its rim is reinforced to support additional attachable in-ground garden-plant watering-wells.

7 Claims, 8 Drawing Sheets

GARDEN POND WITH BOTTOMLESS GARDEN PLANT WATERING-WELL

RELATED APPLICATIONS

This application incorporates Patent No: U.S. Pat. No. 10,123,490 B2 BOTTOMLESS IN-GROUND WATER CONSERVATION AND CONTAMINATION PREVENTION GARDEN-PLANT WATERING-WELL; by Donald E. Harris, Sr.

FIELD OF THE PRESENT EMBODIMENT

This present embodiment relates to garden ponds incorporating a connected bottomless in-ground water conservation and contamination prevention garden-plant watering-well in its construction that conserves water and limits unwanted water waste, including the limiting of pesticide, herbicide, and fertilizer contamination due to uncontrolled water runoff.

BACKGROUND

Plant and flower gardening has been around since the beginning of civilization and with it comes the continuous need for fertilizer, weed and pest prevention, and water, lots and lots of water. Water has always been a precious and, an invaluable resource, and in today's world, it is even more so, and the need for conserving it is at an all-time high.

Nearly every home, in nearly every place, has an area where they will want to have plants and flowers growing, or water features such as a fountain or pond, or attempting to do so. According to the article, Blades of glory: America's love affair with lawns in the Jun. 24, 2011, edition of the magazine, The Week, about 80 percent of American homes have yards. And based on the 2011 American Housing Survey of the United States, there are approximately 100 million houses in America, and this means there are approximately 80 million American yards or variants of yards, capable of being landscaped, and landscapes need watering.

And, according to Water Garden Wikipedia, "Water gardens, and water features, in general, have been a part of public and private gardens since ancient Persian gardens and Chinese gardens." And, "Water features have been present and well represented in every era and in every culture that has included gardens in their landscape and architectural environments. Up until the rise of the industrial age, when the modern water pump was introduced, water was not recirculated but was diverted from rivers and springs into the water garden, from which it exited into agricultural fields or natural watercourses. Historically, water features were used to enable plant and fish production both for food purposes and for ornamental aesthetics."

The scope of this embodiment does not deal with watering lawns. Its primary focus is on garden ponds and the flowering and non-flowering aquatic plants planted within and around them along with the many flowering annuals, perennials, bulbs, small to larger shrubs, flowering and all the varying things gardeners like to plant or place in the soil of all these yards aside from their lawns. That equates to lots of watering, fertilizing, herbicides, and the applying of pesticides; and herein lies the problem: lots of water, contaminated with fertilizers, herbicides, and pesticides can end up flowing away from the target plant and flowers towards areas for which they were not intended.

Every day there is someone somewhere watering a plant in their garden; and along with them are the gardening enthusiasts, who out of love for their little botanical friends, are diligently applying fertilizers, pesticides, and herbicides. One outcome that these well-meaning groups have in common is this: more-often-than-not they watch helplessly as much of the needed water, and gardening additives, flow to surrounding watercourses both natural and human-made and away from the plant for which they were intended. And in today's world water has become a commodity, and its conservation is a responsibility in which each person should participate. There have been attempts at correcting this seemingly universal problem for gardeners for many years, and a prevalent solution was to build up a bowl-shaped mound of soil around the base of the plant, commonly referred to as a soil watering-well. It was intended to contain the water long enough for it to percolate down to the plant's roots. A few of the other solutions are the use of mulches piled around the plant in the hopes of retaining moisture, or stones sunk into the soil around the plant as a border, or place the plant several inches below ground level.

Unfortunately, the aforementioned so-called solutions, along with many others, generally fail soon after their implementation. A soil watering-well tends to absorb water laterally as well as gravitationally, and by the very act of watering, it erodes. And when the soil watering-well erodes the dry soil has less time for the water to saturate down before the water becomes wasteful runoff—and often taking with it gardening chemicals such as fertilizers, pesticides, and herbicides.

Mulch mounds are not much better at solving the issue; in fact, they can exacerbate the problem of garden chemical products like pesticides and herbicide runoff. Mulches are breeding grounds for pests like earwigs and pill-bugs to name a few, which encourages greater use of pesticides, which then accumulates in the mulches; and mulches tend to float and flow with water runoff from over watering and large downpours of rain. These so-called solution failures are typical of the other solutions as well as those not mentioned. The worst consequence of these runoffs are the gardening chemicals used to help grow and protect our garden plants often end up flowing into street gutters, streams, personal in-ground ponds, and other environmentally sensitive areas. Although there are various methods of trying to prevent water and chemical runoff, all, or almost all suffer from one, or more than one disadvantage.

Therefore, there is a need to provide methods and apparatus for improved, and more secure methods, for the preventing of wasteful water runoff and the containment of useful gardening products to prevent them from becoming a detriment, and danger, to their surrounding environments.

As long as there are plants and water, there will be gardening, and gardening is here stay. However, it can be accomplished more effectively and environmentally friendly.

ADVANTAGES OF PRESENT EMBODIMENT

Thus several advantages of one or more aspects would be to provide a garden pond that takes advantage of a bottomless in-ground plant-container that conserves water via the use of a non-eroding watering-well.

Other advantages of one or more aspects are to provide a garden pond that offers aquatic-plants their particular water depth requirements in a level floored pond.

It would further be advantageous to provide a garden pond that can be easily placed in a level hole.

It would also be advantageous to have a garden pond that has attachable and removable twist-locking stems of varying heights that attach to varying sizes of aquatic-plant baskets.

It would also be advantageous to have a garden pond that has an assortment of attachable water features for plant and fish health.

It would further be advantages to have a garden pond made with a long-lasting, environmentally friendly, and durable plastic.

It would also be advantages to have a garden pond that accommodates a gravity drain system for ease of cleaning and water maintenance.

These and other advantages of one or more aspects will become apparent from a consideration of the ensuing description and accompanying drawings.

SUMMARY OF THE PRESENT EMBODIMENT

One embodiment of a Garden Pond with a reinforced socketed base and a connected bottomless watering-well. The socketed base is for inserting stems that support aquatic plant-baskets and assorted aquatic fixtures. The bottomless watering-well in this present embodiment is part of the garden pond's outer wall and is open at both ends and is both functional and decorative. This embodiment also consists of a plant-container that has an above ground-level portion and a below-ground-level portion. The above ground-level portion is the watering-well, and the below-ground-level portion is the well-barrel. The aquatic garden pond feature can be set into the ground, and its rim is reinforced to support additional attachable in-ground garden-plant watering-wells.

BRIEF DESCRIPTION OF THE DRAWINGS

A complete understanding of the present embodiment may be obtained by reference to the accompanying drawings when considered in conjunction with the subsequent, detailed description, in which:

Figs, 3A-3C top view of a garden pond with connected bottomless garden-plant watering-well, a quick-connect valve, and detail enlargements.

FIGS. 5A-5C top and bottom perspective views and side view of,

FIGS. 7A-7F is a collective view of various garden pond accessories;

| Drawings-Reference Numerals | |
|---|---|
| 10 Garden pond | 12 Connected watering-well |
| 14 Twist-lock socket | 16 Twist-lock socket cap |
| 18 Quick-connect valve | 20 Reinforced garden pond floor |
| 22 Reinforced garden pond rim | 24 Reinforced watering-well rim |
| 26 Irrigation drip-line | 28 Twist-lock stem |
| 30 Air-filled pockets | 32 Two-sided male connector |
| 34 Attachable watering-well | 36 Rim hook |
| 38 Twist-lock stem riser | 40 Gravity-drain access |
| 42 Gravity-drain | 44 Aquatic-Plant Basket |
| 46 Suction cup | 48 Unconfined reinforced pond floor |

For purposes of clarity and brevity, like elements and components will bear the same designations and numbering throughout the figures.

DETAILED DESCRIPTION OF THE PRESENT EMBODIMENT

Before this first embodiment of a Garden Pond With Bottomless In-Ground Garden-Plant Watering-Well, along with its methods are disclosed and described, it is to be understood that this present embodiment is not limited to the particular configurations, sizes, or materials disclosed herein as such configurations, sizes, and materials may vary somewhat. Nor are any concept illustrations or diagrams to be construed as limiting. It is also to be understood that the terminology employed is used for describing this particular embodiment. And it is not intended to be limiting; however, for brevity's sake throughout this description, the Garden Pond with Bottomless In-Ground Garden-Plant Watering-Well may be at times simply referenced as a garden pond with connected watering-well or garden pond without watering-well.

Figure 1:
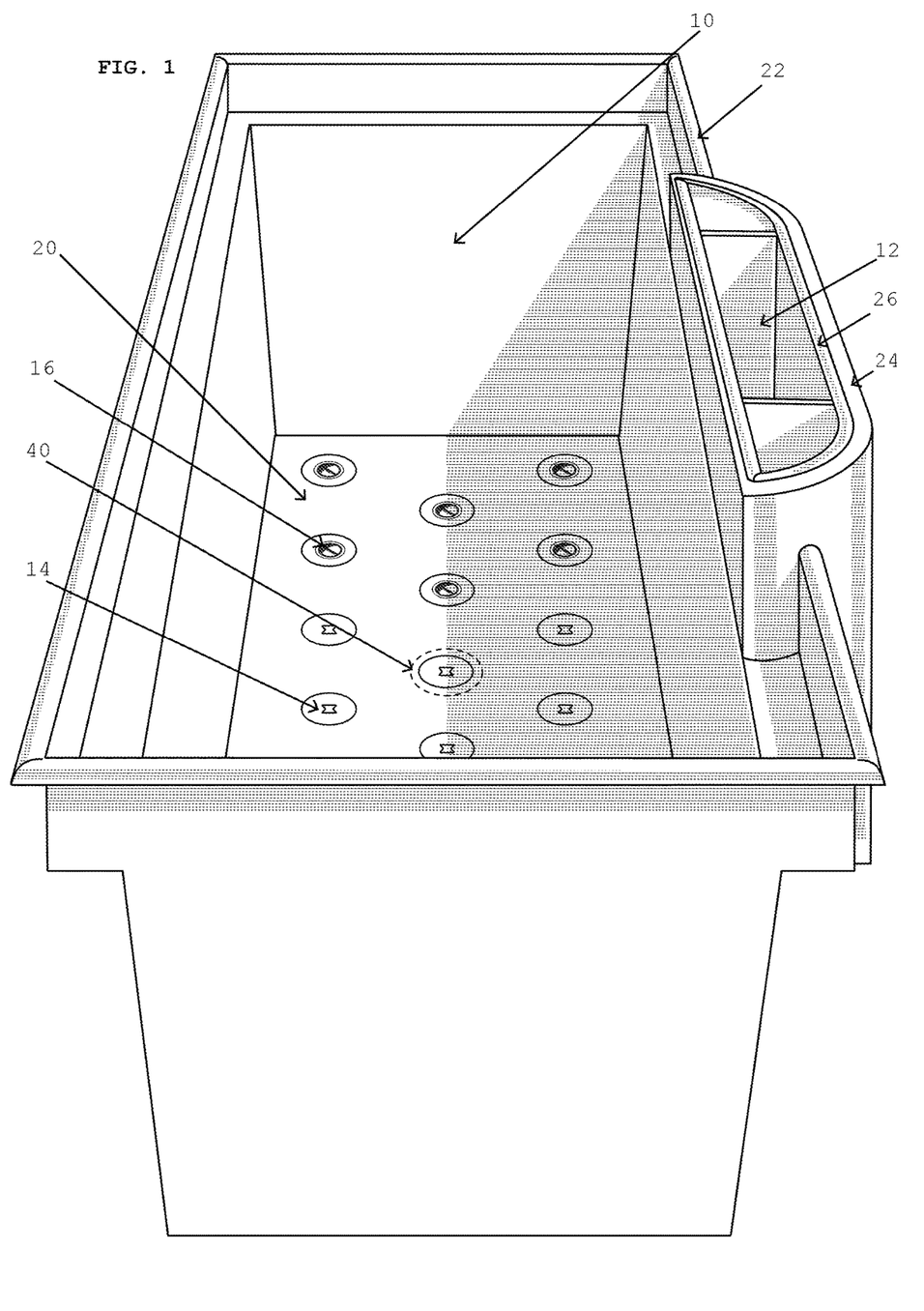
FIG. 1 is a top perspective view of a garden pond with connected bottomless garden-plant watering-well.

FIG. 1 is a top perspective view of a garden pond 10 with a connected watering-well 12, and these may be fabricated from any durable plastic or any other suitable materials. This present embodiment has, for example, an environmentally friendly high-density polyethylene(HDPE) plastic as its construction material. In this embodiment the garden pond 10 with connected watering-well 12 is rectangular, but in alternate embodiments, it may be constructed as an oval, square, or any other geometrical shape or any organic shape or configuration deemed to be aesthetically pleasing or advantageous.

This embodiment of a garden pond 10 with connected watering-well 12 has the connected watering-well's 12 above ground portion extending above an enclosed and ribbed reinforced garden pond rim 22, and its descending portion ending at the garden pond's 10 inset edge. The reinforced watering-well rim 24 allows for added rigidity to the garden pond's 10 walls. Also shown is an irrigation drip-line 26 for drip capable watering-wells 12, and a reinforced garden pond floor for supporting twist-lock stems 28 when locked into twist-lock sockets 14, and twist-lock sockets are female. Twist-lock caps 16 are for keeping twist-lock sockets 14 free of debris when not supporting a twist-lock stem 28. An optional gravity drain access 40 is scored into the reinforced garden pond floor 20 should a gravity drain 42 be desired.

Figure 2:
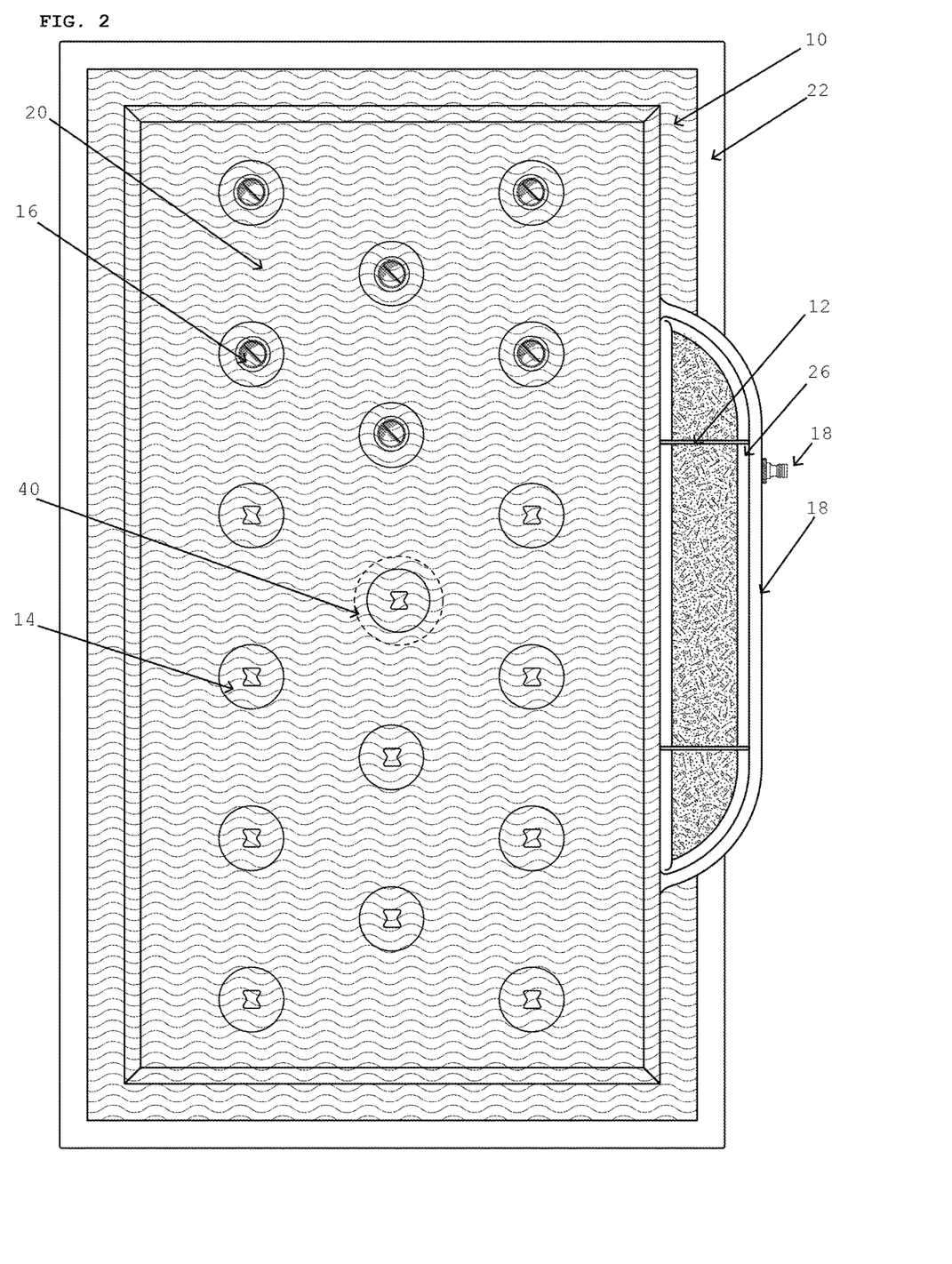
FIG. 2 is a top view of a garden pond with connected bottomless garden-plant watering-well showing water and soil placement in the present embodiment.

FIG. 2 is a top view of a garden pond 10 filled with water, and a connected bottomless garden-plant watering-well 12 filled with soil. A male quick-connect valve 18 for attaching a corresponding hose for use with irrigation-capable watering-wells is attached to the watering-well's 12 outer walls.

Figures 3A, 3B, 3C:
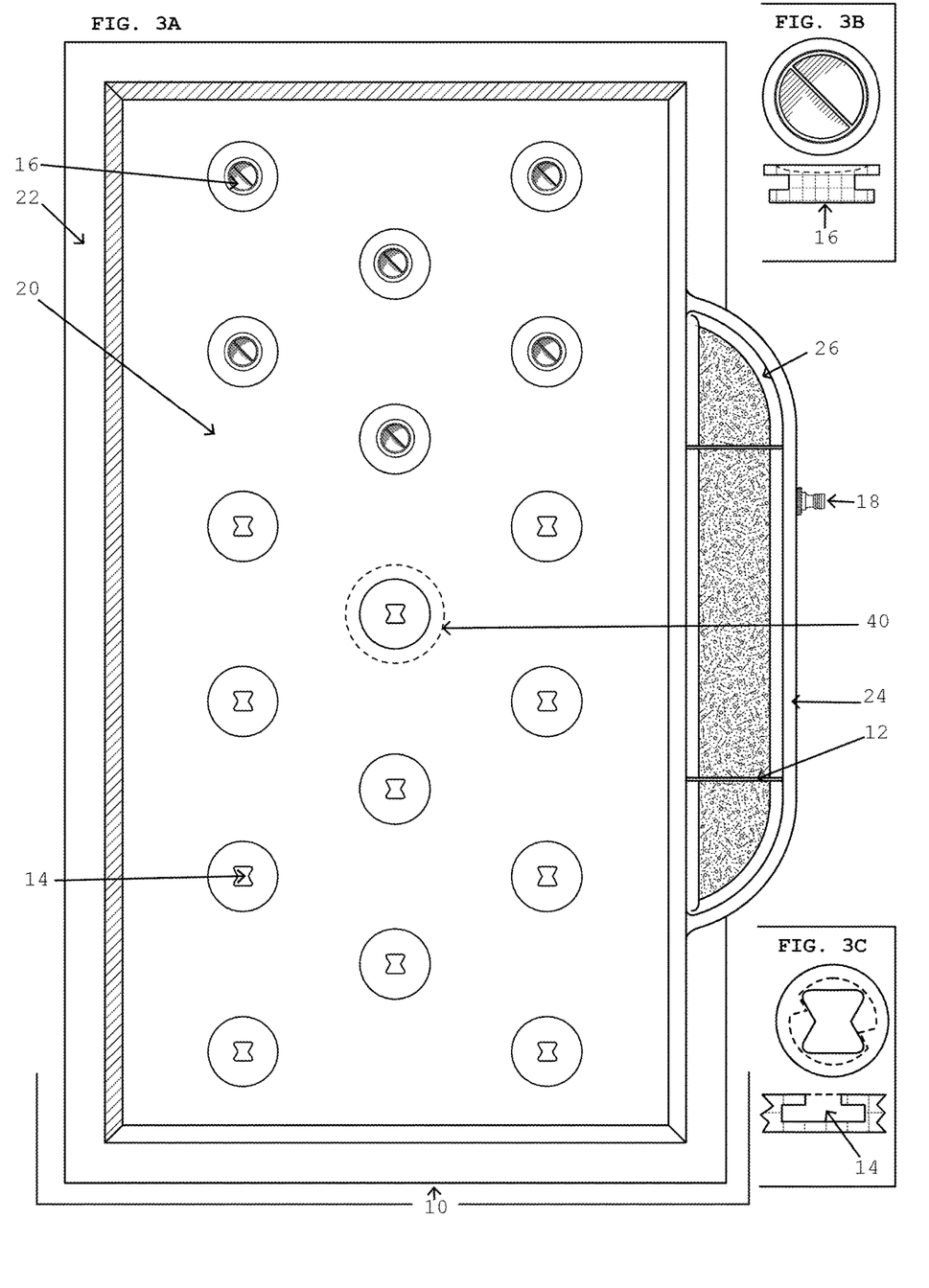
FIG. 3A is a top detail view of a garden pond with connected bottomless garden-plant watering-well.
FIG. 3B is an enlarged detail of a twist-lock socket cap.
FIG. 3C is an enlarged detail view of a twist-lock socket.

FIG. 3A-3C top view of a garden pond with bottomless garden-plant watering-well and detail view enlargements, FIG. 3A is a top detail view of a garden pond 10 with a connected bottomless garden-plant watering-well 12, and a quick-connect valve 18, a reinforced garden pond rim 22, an irrigation drip-line 26, a reinforced watering-well rim 24, the reinforced garden pond floor 20 with a gravity drain access 40 for an optional gravity drain. Also shown are twist-lock sockets 14 with and without twist-lock socket caps 16;

FIG. 3B is an enlarged detail view of the twist-lock socket cap 16 used for keeping twist-lock sockets 14 free of debris when not supporting a twist-lock stem 28 or a two-sided male connector 32;

FIG. 3C is an enlarged detail view of the twist-lock socket 14 in the reinforced garden pond floor 20.

Figure 4:
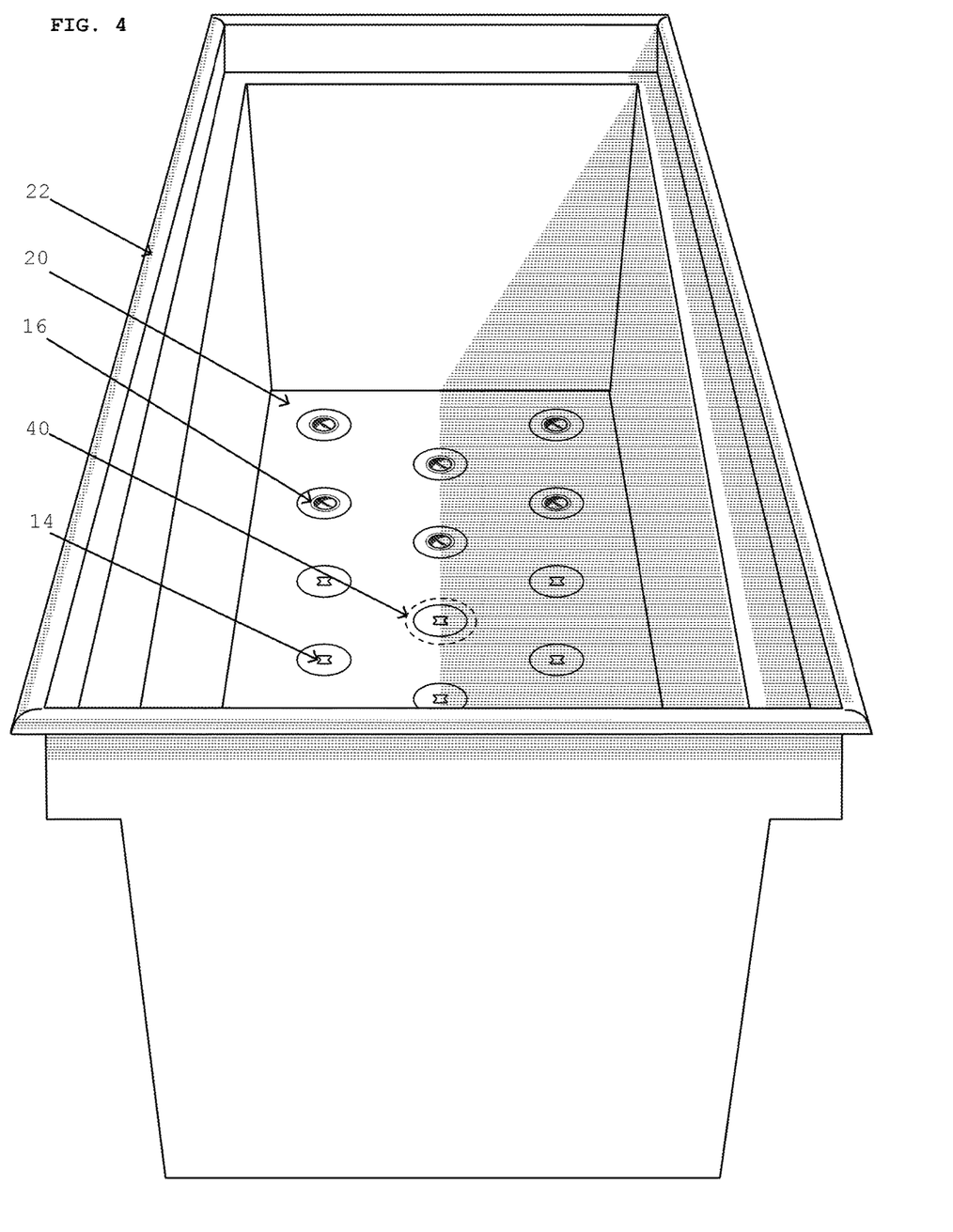
FIG. 4 is a top perspective view of a garden pond without a connected bottomless garden-plant watering-well showing twist-lock sockets with, and without twist-lock socket caps, and gravity drain access.

FIG. 4 is a top perspective view of a garden pond without a connected watering-well 12 or an attachable watering-well 34. The reinforced garden pond floor shows twist-lock sockets 14 with and without twist-lock socket caps 16.

Figure 5A:
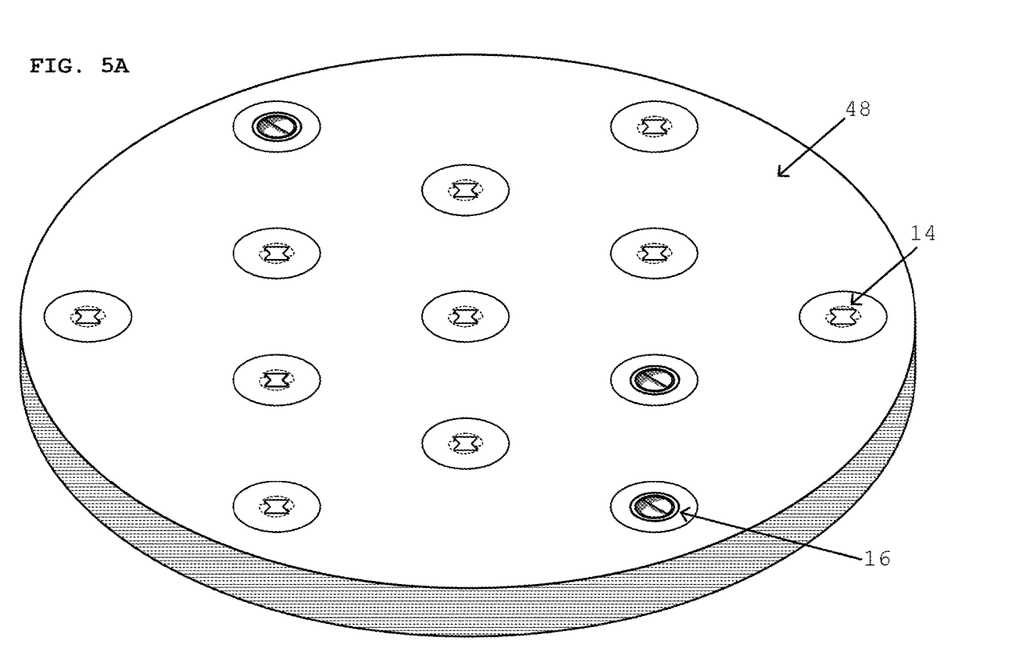
FIG. 5A is a top perspective view of an unconfined reinforced pond floor showing twist-lock sockets and twist-lock socket caps.
Figures 5B, 5C:
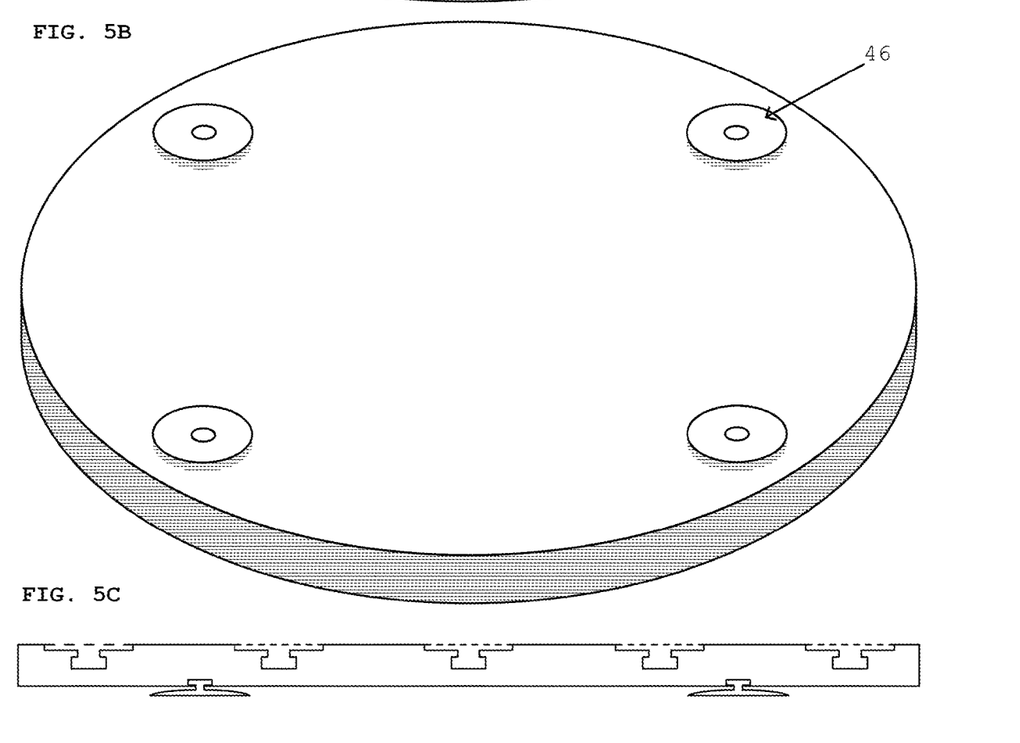
FIG. 5B is a bottom perspective view of the unconfined reinforced pond floor showing suction cups.
FIG. 5C is a side detail view of the unconfined reinforced pond floor showing twist-lock sockets and suction cups.

FIGS. 5A-5C are top and bottom perspective views, and a side view of:

5A is a top perspective view of an unconfined reinforced pond floor 48 showing twist-lock sockets 14 and twist-lock socket caps 16, and an unconfined reinforced pond floor 48, can be any suitable geometric or organic shape;

5B is a bottom perspective view of an unconfined reinforced pond floor 48, showing suction cups 46 for securing the unconfined reinforced pond floor to any acceptable water container;

5C is a side view of the unconfined reinforced pond floor 48, showing suction cups 46 attached to the bottom of the unconfined reinforced pond floor and twist-lock sockets 14.

Figure 6:
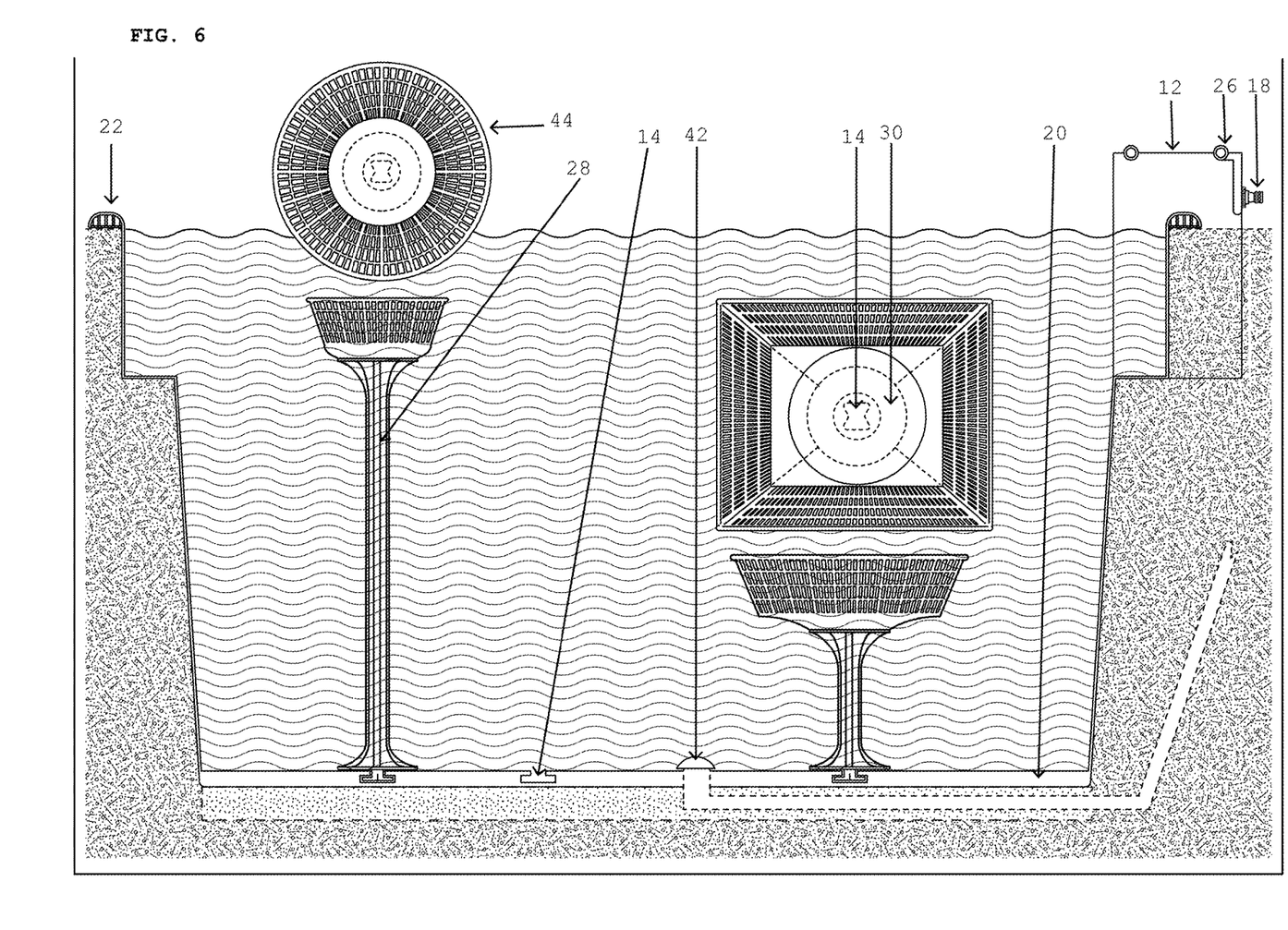
FIG. 6 is a side detail view of a ground garden pond with connected bottomless garden-plant watering-well showing aquatic baskets attached to twist-lock stems locked into a reinforced pond floor with twist-lock sockets and showing an optionally installed gravity drain.

FIG. 6 is a side detail view of a garden pond 10 with connected bottomless garden-plant watering-well 12 showing aquatic-plant baskets 44 attached to twist-lock stems 28 locked into a reinforced garden pond floor 20 with twist-lock sockets 14 and an optional installed gravity-drain 42, aquatic-plant baskets 44 can have ribbed walls with a mesh between the ribs, or have solid walls without the ribs or mesh.

Figure 7A:
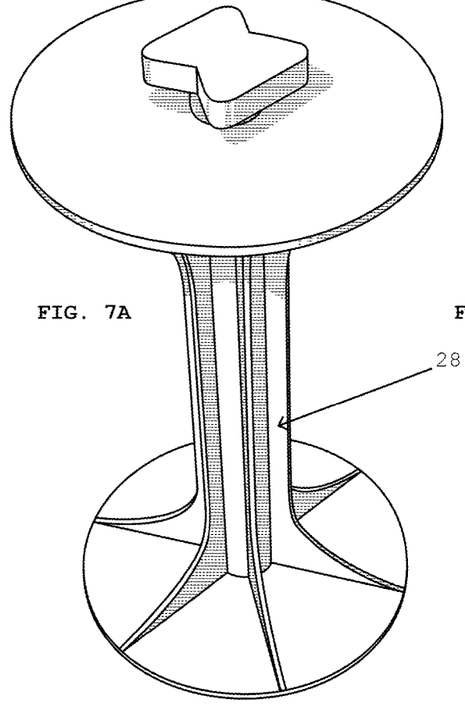
FIG. 7A is a top perspective view of a twist-lock stem for supporting aquatic plant baskets.
Figure 7B:
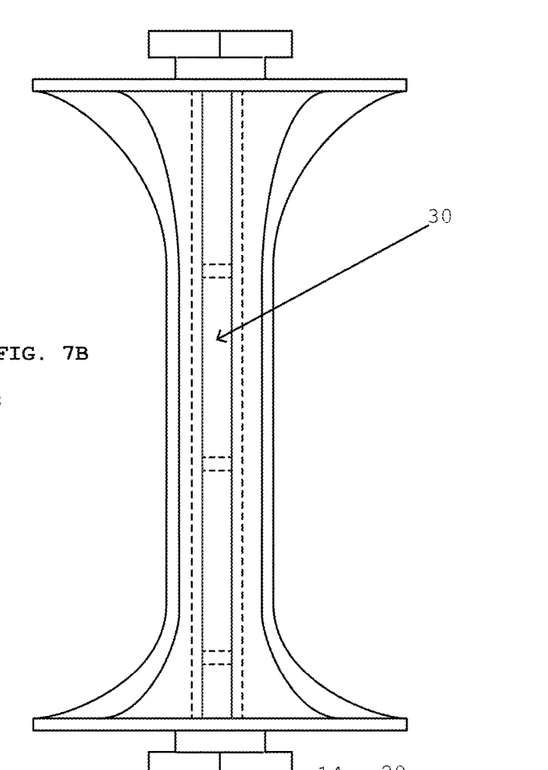
FIG. 7B is a side view of a twist-lock stem showing air-filled pockets and the twist-lock stem's top and bottom male connectors.
Figures 7C, 7D, 7E, 7F:
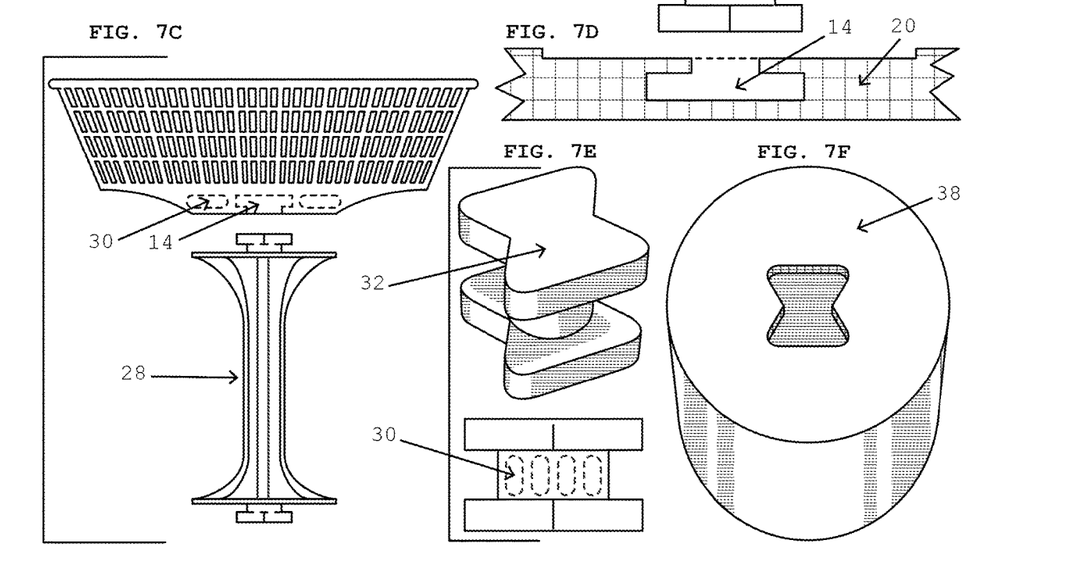
FIG. 7C is a side view of an aquatic-plant basket showing air-filled pockets, a twist-lock socket, and a side view of a twist-lock stem.
FIG. 7D is a detail view of a twist-lock socket in the garden pond's reinforced floor.
FIG. 7E is a top perspective view of a two-sided male connector, and a side detail view of the two-sided male connector's inner air-filled pockets.
FIG. 7F is a top perspective view of a twist-lock stem riser.

FIGS. 7A-7F is a collective view of various garden pond accessories;

FIG. 7A is a top perspective view of a twist-lock stem 28 for supporting aquatic plant baskets, twist-lock stems 28 are male;

FIG. 7B is a side view of a twist-lock stem 28 showing air-filled pockets 30, and the twist-lock stem's top and bottom male connectors;

FIG. 7C is a side view of an aquatic-plant basket 44 showing its air-filled pockets 30, as each garden pond accessory has these air-filled pockets 30 constructed in them allowing for unlocked or detached accessories to float to the pond's surface for ease of extraction and ease of re-attachment, a twist-lock socket 14, and a side view of a twist-lock stem 28;

FIG. 7D is a detail view of a twist-lock socket's 14 inset edge sized to match the circumference and thickness of a twist-lock stem's 28 top and bottom flanges for when they are locked into the twist-lock socket 14 in the garden pond's reinforced floor 20 to help maintain a smooth pond floor;

FIG. 7E is a top perspective view of a two-sided male connector 32, and a side detail view of the two-sided male connector's inner air-filled pockets 30; the two-sided male connector is for locking aquatic-plant baskets 44 and twist-lock stem risers 38 or any accessory with a twist-lock socket 14 together for attachment to the reinforced garden pond floor 20;

FIG. 7F is a top perspective view of a twist-lock stem riser 38 that has a top and bottom twist-lock socket 14, and the twist-lock stem riser 38 allows for adding extra height to aquatic-plant baskets 44 for shorter twist-lock stems 28.

Figure 8:
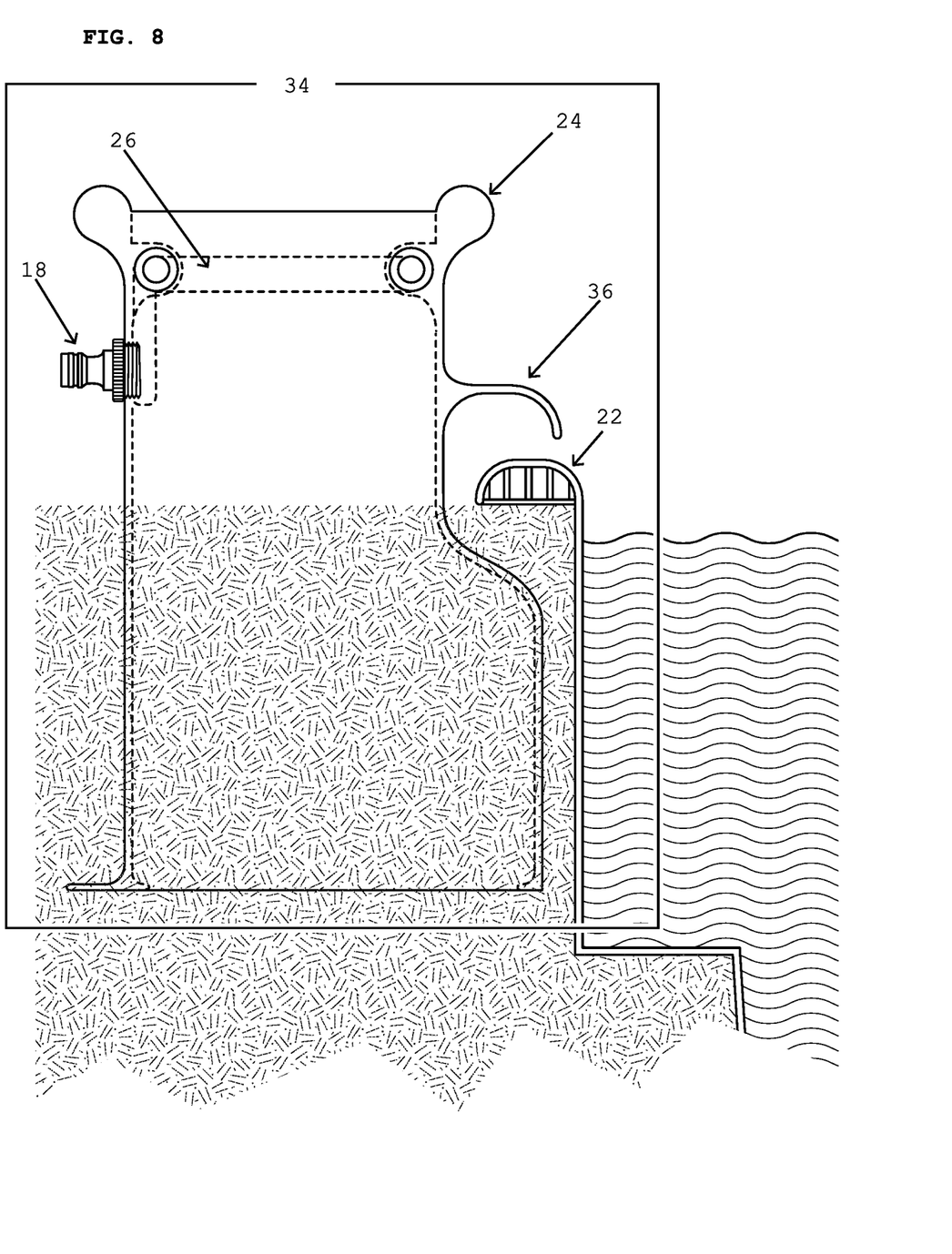
FIG. 8 is a detail view of an attachable bottomless watering-well with its quick connect valve, a rim hook, and a detail view of the garden pond's reinforced rim.

FIG. 8 is a detail view of an optional attachable watering-well 34 with a rim hook 36 for attaching to the reinforced garden pond rim 22 that is enclosed and ribbed to help steady the pond's rim on the soil's surface, and a quick-connect valve 18 screwed through a wall of the attachable watering-well 34 and into an irrigation drip-line 26.

Since other modifications and changes varied to fit particular operating requirements and environments, they will be apparent to those skilled in the art of plastic fabrication. And this present embodiment is not considered limited to the examples chosen for purposes of disclosure and covers all changes and modifications which do not constitute departures from the true spirit and scope of this embodiment.

Having thus described the present embodiment, what is desired to be protected by Letters Patent is presented in the subsequently appended claims.

What is claimed is:
1. A garden pond for conserving water comprising:
 a garden pond container for containment of water for freshwater aquatic plants and fish, said garden pond container comprising:
  a reinforced garden pond floor with a twist lock socket;
  a gravity drain access;
  a connected bottomless watering-well for adding non-aquatic plants;
  a reinforced garden pond rim configured to support attachable bottom-less in ground watering wells and decorative pieces; and
  a reinforced watering-well rim configured to support attachable bottom-less in ground watering wells and decorative pieces;
 a twist lock stem configured to be supported in the twist lock socket, the twist lock stem comprising an air-filled pocket for floatation; and
 an aquatic plant basket for holding aquatic plants supported by the twist lock stem.

2. The garden pond of claim 1, wherein the reinforced garden pond floor is integrally embedded in said garden pond container.

3. The garden pond of claim 1, wherein the reinforced garden pond floor is detachable from said garden pond container and includes suction cups on a bottom side.

4. The garden pond of claim 1, further comprising a twist-lock socket cap for capping the twist-lock socket to keep it free of debris.

5. The garden pond of claim 1, wherein the connected bottomless watering-well and/or the attachable bottom-less watering well comprises a quick-connect valve and/or an irrigation drip-line.

6. The garden pond of claim 1, further comprising a rim hook for attaching an attachable bottom-less in ground watering well.

7. The garden pond of claim 1, further comprising an attachable bottom-less in ground watering well.

* * * * *